No. 741,395. PATENTED OCT. 13, 1903.
F. T. CABLE.
STEERING MECHANISM.
APPLICATION FILED NOV. 7, 1902.
NO MODEL. 3 SHEETS—SHEET 2.

WITNESSES: INVENTOR:
Frank T. Cable
BY
ATTORNEY

No. 741,395. PATENTED OCT. 13, 1903.
F. T. CABLE.
STEERING MECHANISM.
APPLICATION FILED NOV. 7, 1902.
NO MODEL. 3 SHEETS—SHEET 3.
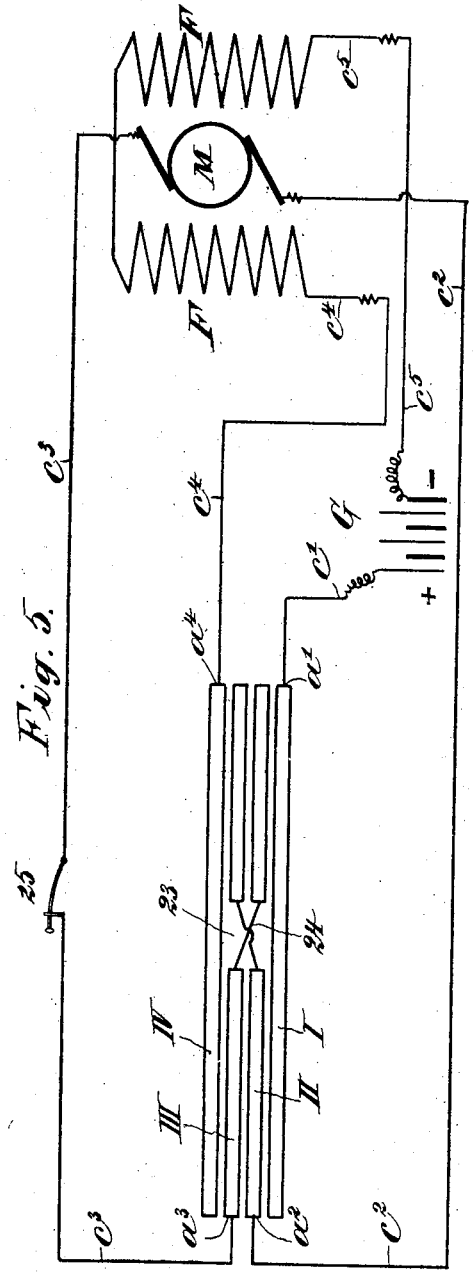
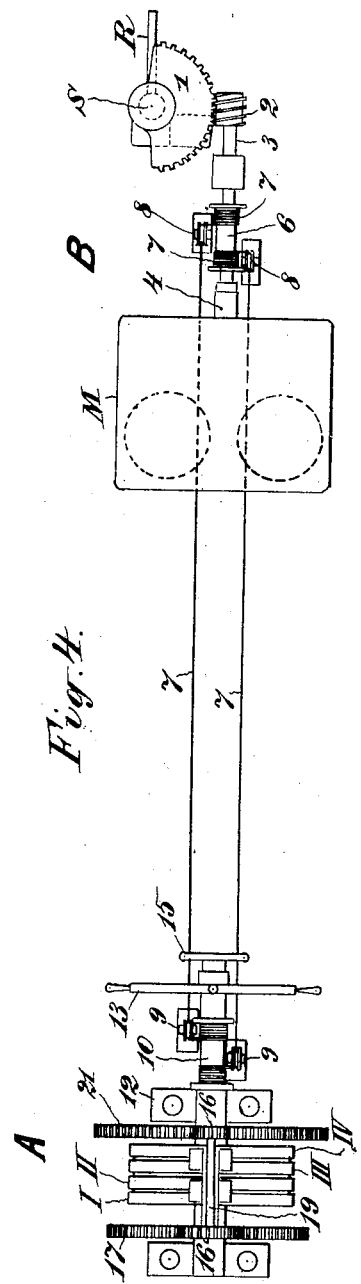
WITNESSES:
INVENTOR:
Frank T. Cable
BY
Henry Cannett
ATTORNEY No. 741,395. Patented October 13, 1903.

UNITED STATES PATENT OFFICE.

FRANK T. CABLE, OF NEW SUFFOLK, NEW YORK, ASSIGNOR TO ELECTRIC BOAT COMPANY, A CORPORATION OF NEW JERSEY.

STEERING MECHANISM.

SPECIFICATION forming part of Letters Patent No. 741,395, dated October 13, 1903.

Application filed November 7, 1902. Serial No. 130,369. (No model.)

*To all whom it may concern:*

Be it known that I, FRANK T. CABLE, a citizen of the United States, residing at New Suffolk, in the county of Suffolk and State of New York, have invented certain new and useful Improvements in Steering Mechanisms, of which the following is a specification.

This invention relates to the class of electrical steering apparatus or gear for vessels, and has for its object a gear which may be operated by an electric motor or by hand at the will of the operator.

Figure 1:
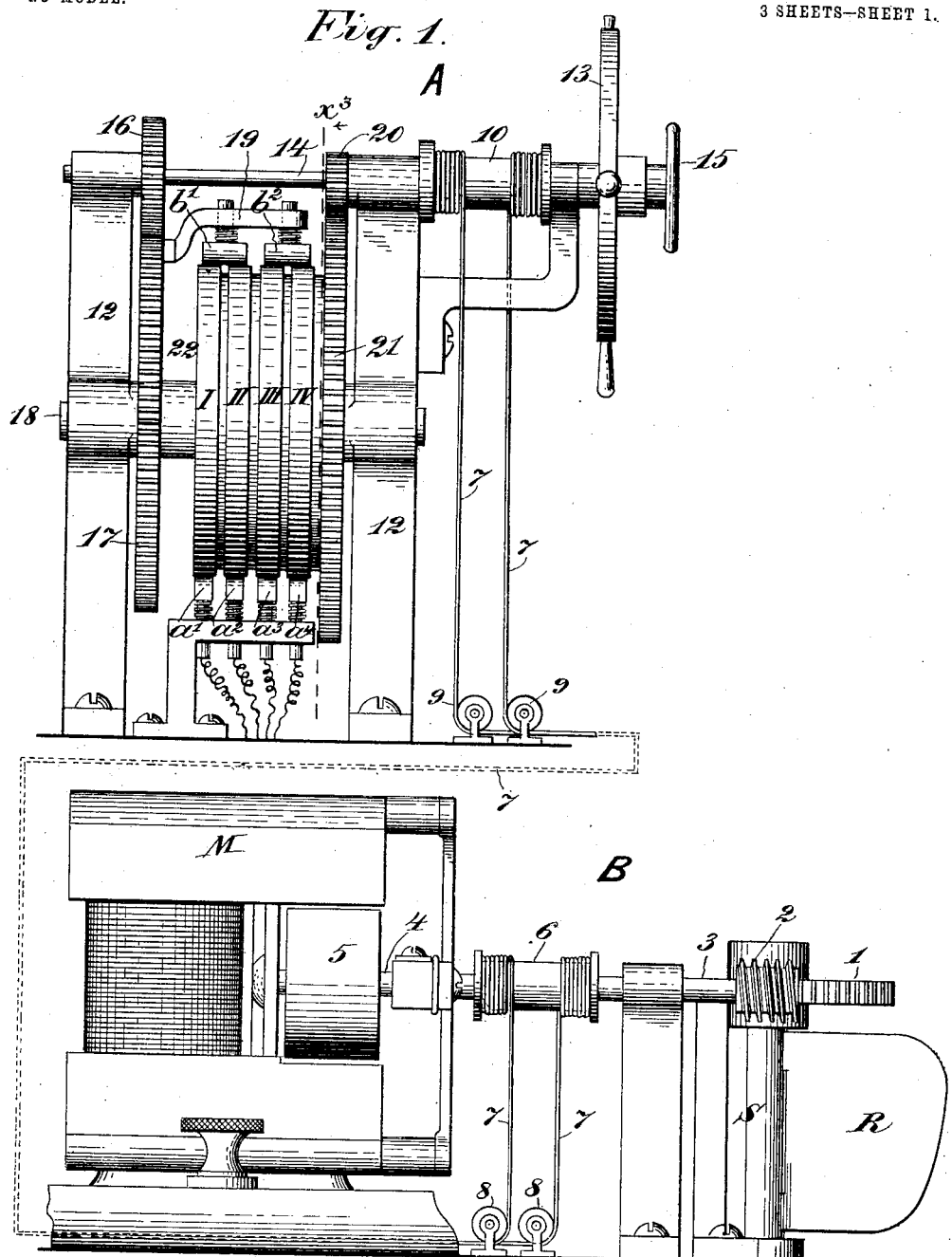
Figure 2:
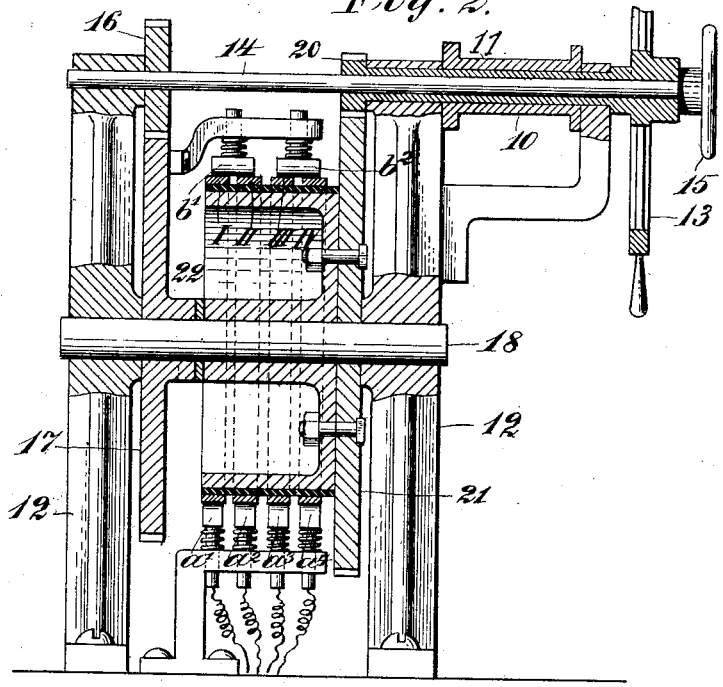
Figure 3:
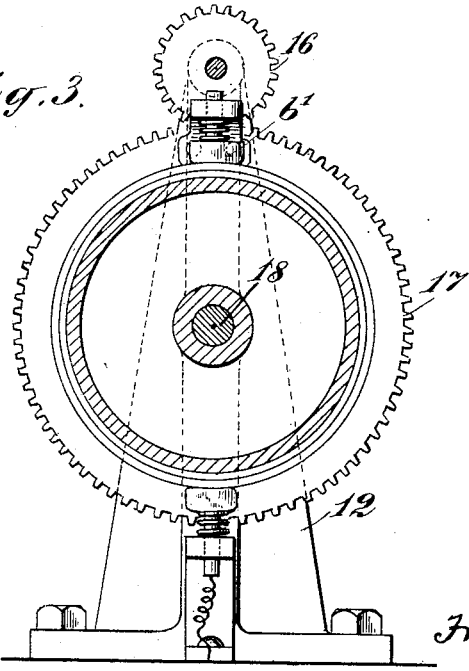

In the accompanying drawings, which serve to illustrate an embodiment of the invention, Figure 1 is a side elevation of the apparatus or mechanism on a relatively large scale. Fig. 2 is a vertical mid-section of the part A of same, taken in the axis of the windlass-drum. Fig. 3 is a vertical transverse section at $x^3$ in Fig. 1. Fig. 4 is a plan of the apparatus on a smaller scale than Figs. 1 to 3. Fig. 5 is a diagrammatic view showing the circuits.

Before proceeding with a detailed description of the apparatus it may be well to explain that in Fig. 1 the two major parts A and B of the apparatus are not shown in their ordinary relative positions for lack of room; but the ordinary positions of these parts is illustrated in Fig. 4. The part A includes the hand-steering gear and electrical controlling devices, and the part B includes the electric motor and worm-gearing at the rudder.

R designates the rudder, and S the stem thereof. On the said stem is fixed a toothed worm-wheel or segment 1, with which gears a worm or screw 2, fixed on a shaft 3, which forms a continuation of the arbor 4 of the armature 5 of an electric motor M. On this shaft or arbor 3 is fixed the windlass-drum 6, on which are wound in opposite directions the tiller-ropes 7. These ropes pass down under guide-sheaves 8, thence to guide-sheaves 9 at the part A, and thence up to a windlass-drum 10 at that point. This drum 10 is fixed on a hollow shaft 11, mounted rotatively in a suitable frame 12. On the shaft 11 is fixed a steering-wheel 13. Now it will be obvious that by rotating the steering-wheel 13 the shaft 11 and drum 10 will be rotated and that by this drum through the connecting tiller-ropes 7, drum 6, shaft 4, and worm-gear the rudder R will be shifted for steering, or if the electric motor 6 be set in motion it will act through the shaft or arbor 3 and the worm-gearing to actuate or shift the rudder. When operating by hand, no current is used, and the armature of the motor revolves idly; but when power is required the current is supplied to the motor by means of a convenient switch or circuit-closer, when the wheel 13 will rotate idly. The means for controlling the electric motor for starting it by hand and stopping it automatically will now be described.

Referring to the part A, through the hollow shaft 11 extends a rotatively-mounted shaft 14, that is independent of the shaft 11. This shaft 14 has on its outer end a hand-wheel 15 and at its other end a pinion 16, which gears with a spur-wheel 17, loosely mounted on and rotative about a fixed shaft 18 in the frame. This wheel 17 has on it an arm 19, carrying two brushes or bridge contacts $b'$ and $b^2$. On the hollow shaft 11, carrying the drum 10, is secured a pinion 20, which gears with a spur-wheel 21, secured to a drum 22, rotative on the fixed shaft 18. On the drum 22 and insulated from it and from each other are four floating ring-like contacts I, II, III, and IV, upon which bear four brushes $a'$, $a^2$, $a^3$, and $a^4$, respectively. These brushes are mounted in the frame 12 and in the operating-circuits, as will be described with reference to Fig. 5.

In the diagram Fig. 5, G is the generator and M is the motor. The floating contact I is connected, through the brush $a'$ and conductor $c'$, to the positive pole of the generator G. The contacts II and III are connected, through the respective brushes $a^2$ and $a^3$ and conductors $c^2$ and $c^3$, with the armature of the motor. The contact IV is connected, through the brush $a^4$ and conductor $c^4$, with one pole of the field-magnet F of the motor, and the other pole of said magnet is connected by a conductor $c^5$ with the negative pole of the generator. There is a break at 23 in the two floating contacts II and III, as seen in Fig. 5, and at this point there is a cross connection 24 between the contacts II and III. The operation is as follows: Assuming the bridging-brushes $b'$ and $b^2$ to be at the break 23 and the motor M inactive, in order to set the motor in action the hand-wheel 15 is turned. This wheel acts through the shaft 14, pinion 16, and spur-wheel 17 to shift the brushes $b'$ and $b^2$ until they connect the respective floating contacts I II and III IV electrically, and thus close the current through the motor M. This causes the armature of the motor, acting through the shaft 3, worm 2, and segment 1, to shift the rudder. In rotating, however, the shaft 3 rotates the drum 6 and through the tiller-ropes 7 the drum 10 at A. This drum rotates the shaft 11 and through the pinion 20 and spur-wheel 21 the drum 22, carrying the floating contacts. The consequence is that this movement of the drum 22 finally brings the break 23 again under the brushes $b'$ and $b^2$, thus breaking the circuit and stopping the motor. Now if the hand-wheel 15 be turned so as to shift the bridging-brushes $b'$ and $b^2$ in the opposite direction the direction of the current through the motor will be reversed by the cross connections 24 between the floating contacts II and III, and the motor will be reversed, so as to shift the rudder in the opposite direction. Obviously the extent to which the bridging-brushes $b'$ and $b^2$ are primarily shifted by the hand-wheel 15 will govern the extent to which the rudder will be shifted by the motor.

In Fig. 5, 25 designates diagrammatically the switch employed for breaking the circuit through the motor when the steering-gear is to be operated by hand through the wheel 13.

It will be noted that in the construction shown a steering gear or apparatus is provided which may be operated by hand or be operated by an electric motor under the control of the hand. The motor is arrested automatically when it shall have shifted the rudder to starboard or port to an extent governed by the hand-operated controlling devices—that is to say, the hand-operated means for setting in operation and reversing the motor, comprising the brushes and the means for moving them, is operatively independent mechanically of the motor and remains stationary while the motor is operating to shift the rudder.

Obviously the part A of the apparatus may be situated at any point, as in the pilot-house or conning-tower of the boat, and the part B be situated at another point, the connecting tiller ropes or chains being passed over guide-sheaves necessary to change their direction.

Having thus described my invention, I claim—

1. A mechanism comprising a part to be shifted, an electric motor, gearing between said part and the motor whereby the latter shifts the former, a drum 10, mechanism between said drum and gearing whereby the part may be shifted by hand, a rotatable carrier for floating contacts, gearing coupling the drum 10 and said carrier, the floating contacts on said carrier, a generator, circuits including said generator, the motor and said floating contacts, circuit making and breaking contacts mounted to move concentrically about the said carrier, and means for manually operating the last-named contacts.

2. A steering apparatus for vessels, comprising a rudder, gearing for shifting the same, an electric motor connected with and operating said gearing, a windlass-drum secured on the shaft driven by the armature of the motor, the windlass-drum 10, the tiller-ropes connecting said windlass-drums whereby one drum may drive the other, a steering-wheel for rotating the drum 10, the drum 22, gearing between said drum and the drum 10, whereby the latter drives the former, the floating contacts on said drum, a generator, circuits including said generator, said floating contacts, and the motor, circuit making and breaking brushes $b'$ and $b^2$, bearing on the said floating contacts, and means, operated by hand, for actuating said brushes.

3. In a steering apparatus for vessels, the combination with the rudder, gearing for operating same, an electric motor which actuates said gearing, a generator for supplying said motor and circuits including said motor and generator, of means for controlling the operation of said motor, said means comprising a pinion 16, means for driving said pinion from said motor, a rotatively-mounted spur-wheel 17, driven by said pinion, a drum 22, connected to and rotating with the wheel 17, the four floating contacts I, II, III, IV, carried by the drum 22, the brushes $a'\ a^2\ a^3\ a^4$ bearing on the respective floating contacts and forming parts of the circuit, the bridging-brushes $b'$ and $b^2$, bearing respectively on the contacts I, II, and III, IV, and means for shifting said bridging-brushes by hand, said contacts II and III having breaks at 23, and cross connections at said break, substantially as set forth.

In witness whereof I have hereunto signed my name, this 1st day of November, 1902, in the presence of two subscribing witnesses.

FRANK T. CABLE.

Witnesses:
 HOWARD G. TUTHILL,
 FRANK L. BRAKE.